(12) United States Patent
Thorpe et al.

(10) Patent No.: US 7,692,858 B2
(45) Date of Patent: Apr. 6, 2010

(54) METHOD AND APPARATUS FOR INTERNALLY ZEROING A SIGHT

(75) Inventors: Michael David Thorpe, Penetanguishene (CA); Victor Jarinov, Concord (CA)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/207,313

(22) Filed: Sep. 9, 2008

(65) Prior Publication Data

US 2009/0002856 A1    Jan. 1, 2009

Related U.S. Application Data

(62) Division of application No. 11/303,127, filed on Dec. 15, 2005, now Pat. No. 7,440,185.

(51) Int. Cl.
*G02B 23/00* (2006.01)
(52) U.S. Cl. .................................... 359/429; 359/428
(58) Field of Classification Search ................ 359/399, 359/424, 427–429
See application file for complete search history.

(56) References Cited

U.S. PATENT DOCUMENTS

| | | | |
|---|---|---|---|
| 2,909,964 A | 10/1959 | Keuffel et al. | |
| 3,161,716 A | 12/1964 | Burris et al. | |
| 3,506,329 A | 4/1970 | Weaver | |
| 3,608,997 A | * 9/1971 | Humphrey | ........... 359/557 |
| 3,642,341 A | 2/1972 | Seifried | |
| 3,728,948 A | 4/1973 | Fraser | |
| 4,806,007 A | 2/1989 | Bindon | |
| 4,982,502 A | 1/1991 | Weyrauch | |
| 7,365,924 B1 | 4/2008 | Millett | |

* cited by examiner

*Primary Examiner*—Lee Fineman
(74) *Attorney, Agent, or Firm*—Haynes and Boone, LLP

(57) ABSTRACT

A sight includes a housing with first and second openings, and includes an optics section that is disposed within the housing, that has image erecting optics and eyepiece optics, and that optically influences radiation received through the first opening from a scene, so as to deliver through the second opening a viewable image that is a function of the radiation. An adjusting section facilitates adjustment of the position of the image erecting optics and the eyepiece optics within the housing.

7 Claims, 9 Drawing Sheets

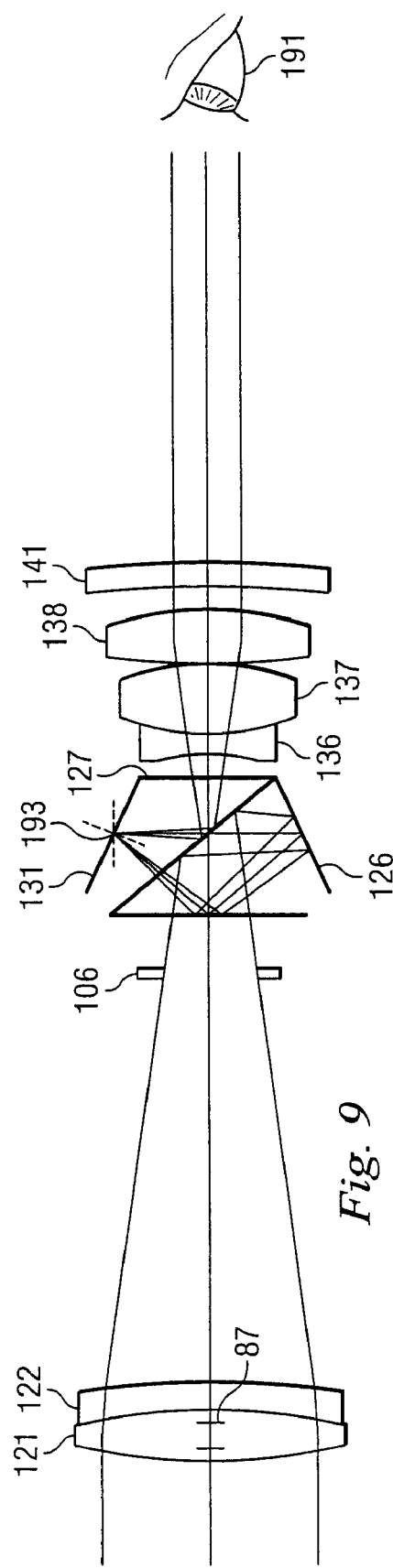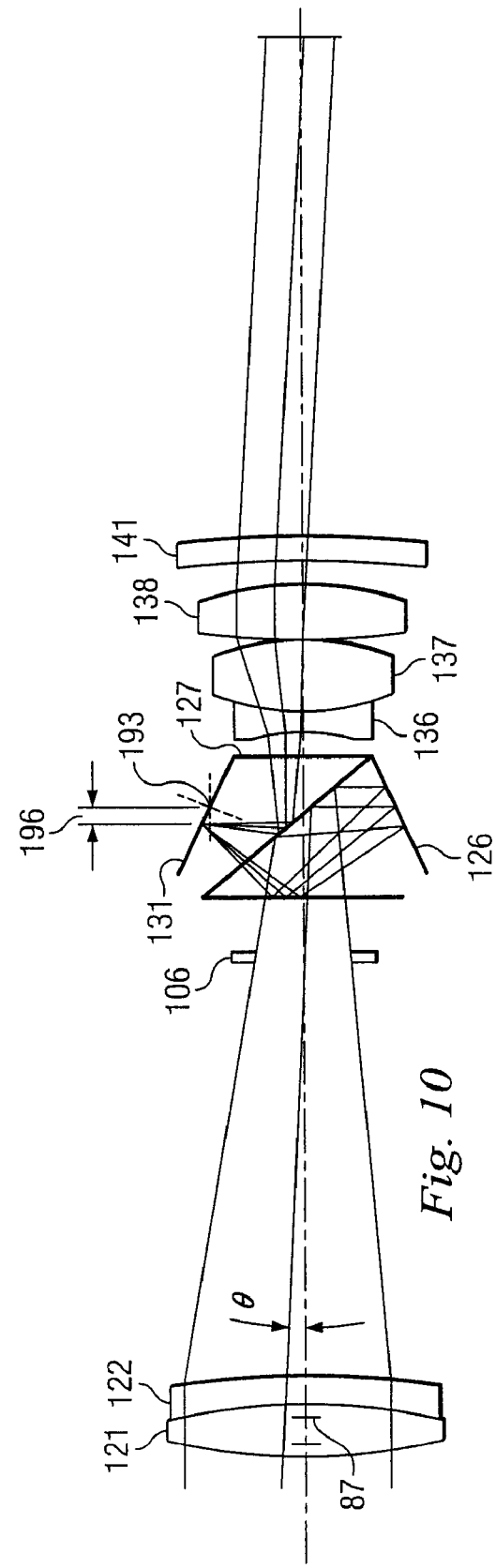

METHOD AND APPARATUS FOR INTERNALLY ZEROING A SIGHT

This application is a division of U.S. Ser. No. 11/303,127 filed Dec. 15, 2005.

TECHNICAL FIELD OF THE INVENTION

This invention relates in general to techniques for zeroing a sight and, more particularly, to techniques for internally zeroing a sight.

BACKGROUND OF THE INVENTION

Over the years, various techniques and devices have been developed to help a person accurately aim a weapon such as a rifle. One common approach is to mount a sight or scope on the weapon. A person then uses the sight or scope to view an intended target in association with a reticle, often with a degree of magnification. Although existing weapon sights have been generally adequate for their intended purposes, they have not been satisfactory in all respects.

For example, after mounting a sight on a rifle, there is always some pointing error for a specific target distance that must be "zeroed" out in order to shoot accurately. In other words, for the target distance in question, an adjustment needs to be made so that the reticle cross-hairs of the sight will be centered on the point where the bullet will strike at that distance. One known approach is to use an external adjustment mechanism that adjusts the position of the entire sight in elevation and azimuth with respect to its mount on the rifle. A different known approach is to move an optical element internally within the sight, in order to readjust the effective pointing direction of the sight.

The traditional approach for internal zeroing is to move the optical erecting element within the sight. This essentially moves the secondary image plane so as to correct for the zeroing error. Some sights that use this approach are relatively long, because the objective image is reimaged by the erecting element to a conjugate plane, which is then viewed through the eyepiece. Shorter and more compact sights use a prism to erect the image. The prism can be internally moved with respect to other optical components, in order to displace the image at the reticle plane.

Although known techniques for internal zeroing have been generally adequate for their intended purposes, they have not been entirely satisfactory in all respects. One consideration is that the known techniques for internal zeroing will realign the aim point of the rifle, but also involve a degradation of the image quality. For example, moving an erecting prism within the light path relative to other optical components can produce axial coma and astigmatism that are associated with a loss of resolution for the axial and off-axis fields. This limits the effective zeroing range for this approach to a fraction of a degree.

SUMMARY OF THE INVENTION

One of the broader forms of the invention relates to zeroing a sight having a housing with first and second openings, and having an optics section within the housing that optically influences radiation from a scene received through the first opening so as to deliver through the second opening a viewable image that is a function of the radiation, where the optics section includes image erecting optics and eyepiece optics. This form of the invention involves adjusting the position of the image erecting optics and the eyepiece optics relative to the housing.

BRIEF DESCRIPTION OF THE DRAWINGS

A better understanding of the present invention will be realized from the detailed description that follows, taken in conjunction with the accompanying drawings, in which:

FIG. 9 is a diagrammatic view showing the optical elements of the sight of FIG. 1, and showing chief and marginal rays for radiation from a not-illustrated scene that is traveling through the sight.

FIG. 10 is a diagrammatic view similar to FIG. 9, but showing a pointing error of θ° degrees.

DETAILED DESCRIPTION

Figure 1:
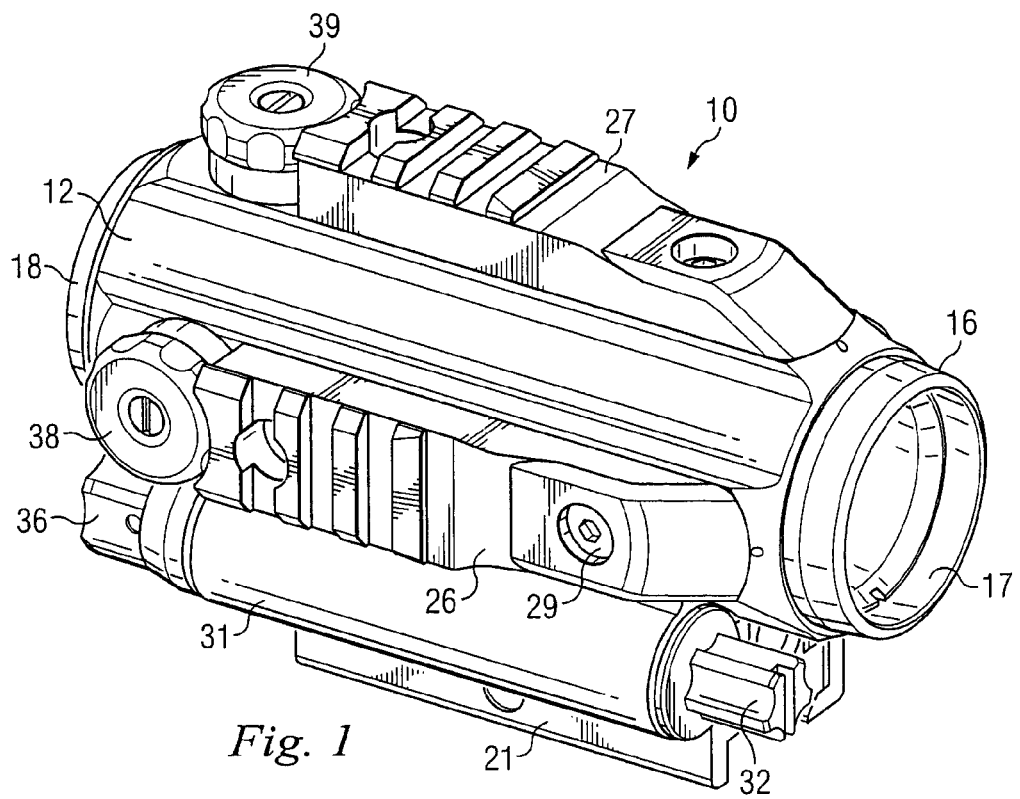
FIG. 1 is diagrammatic perspective view of an apparatus that is a weapon sight configured to be removably mounted on a not-illustrated weapon such as a rifle, and that embodies aspects of the present invention.
Figure 2:
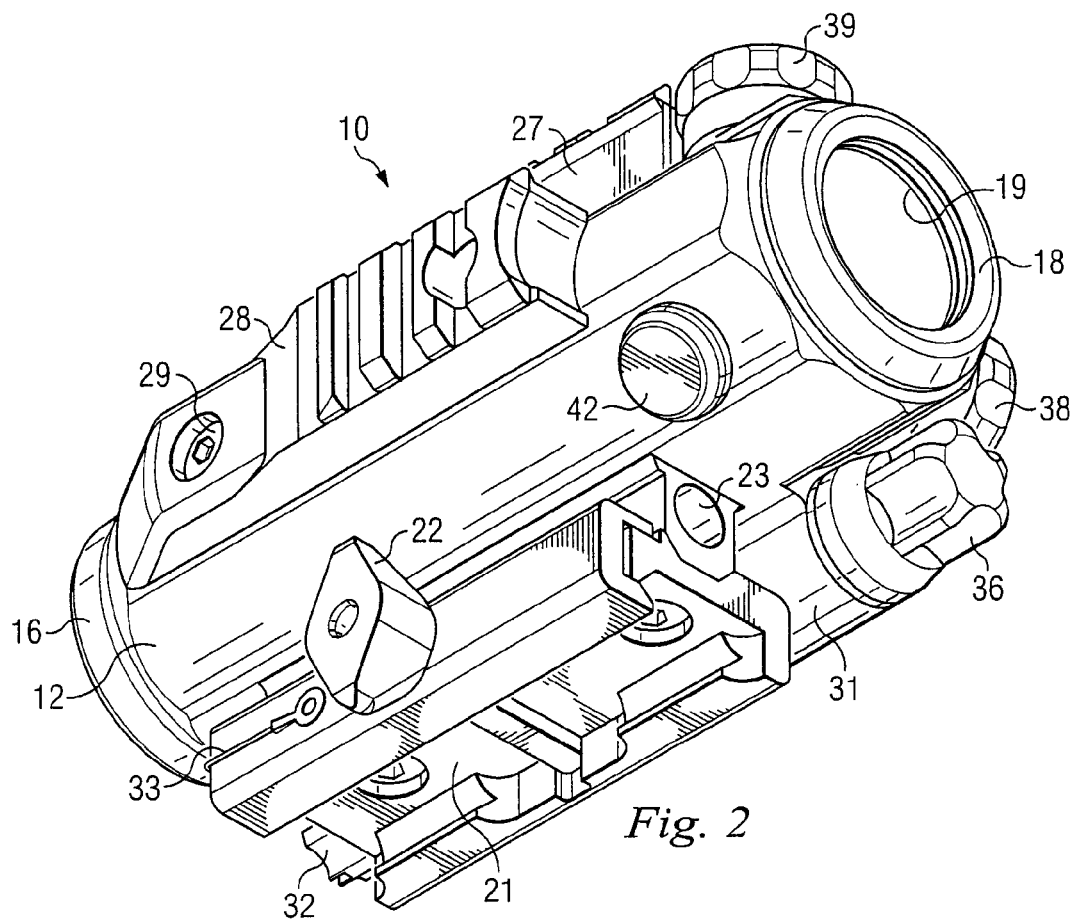
FIG. 2 is a further diagrammatic perspective view of the sight of FIG. 1, taken from a different direction.

FIG. 1 is diagrammatic perspective view of an apparatus that is a weapon sight configured to be removably mounted on a not-illustrated weapon such as a rifle, and that embodies aspects of the present invention. FIG. 2 is a further diagrammatic perspective view of the sight 10, taken from an opposite side of the sight.

With reference to FIGS. 1 and 2, the sight 10 includes a tubular housing 12. A ring 16 is mounted on one end of the housing 12. The ring 16 defines an inlet opening 17 that permits radiation from a non-illustrated scene to enter the housing 12. A further ring 18 is mounted on the opposite end of the housing 12. The ring 18 defines an eyepiece opening 19 that allows radiation to exit the housing 12, and to be viewed by the eye of a person.

A mounting mechanism 21 is secured to the underside of the housing 12. The mounting mechanism 21 can be used in a known manner to removably mount the sight 10 on a standard mounting rail of a non-illustrated weapon, such as a rifle. The mounting mechanism 21 has a knob 22 that can be manually rotated in order to attach the sight 10 to a weapon, or to detach the sight from a weapon. A cylindrical opening 23 extends through part of the mounting mechanism 21 in a direction lengthwise of the sight 10, in order to reduce the overall weight of the sight. Three rubber bumpers 26-28 are removably mounted by screws 29 to the top and sides of the housing 12. The bumpers 26-28 provide a degree of shock protection for the sight 10.

A cylindrical tube 31 is fixedly coupled to one side of the housing 12, between the mounting mechanism 21 and the rubber bumper 26. The tube 31 extends lengthwise of the sight 10. The tube 31 has an internally threaded opening at one end, and a removable battery cover 32 has threads that engage the threaded opening. A battery compartment is provided within the tube 31 at the end thereof nearest the cover 32, and the cover 32 can be removed, in order to replace a battery. A flexible retaining strap 33 has one end coupled to the battery cover 32, and its other end coupled to the mounting mechanism 21, so that the battery cover 32 will not be inadvertently lost or misplaced when it is removed for battery replacement.

A rotatable control knob 36 is provided at the opposite end of the cylindrical tube 31. In the disclosed embodiment, the control knob 36 can be rotated to any of 15 different positions. The position of the knob 36 controls the brightness of an illuminated reticle, as discussed in more detail later. Two adjusting knobs 38 and 39 are rotatably supported on the housing 12, and are offset from each other by an angle of 90° with respect to an optical axis of the sight 10. The adjusting knobs 38 and 39 are disposed near the end of the sight 10 that has the eyepiece opening 19, and are used to "zero" the sight 10 in a manner discussed in more detail later. A spring retaining cap 42 has threads that engage a threaded opening provided through a side of the housing 12 opposite from the adjusting knobs 38 and 39. The spring retaining cap 42 is discussed in more detail later.

Figure 3:
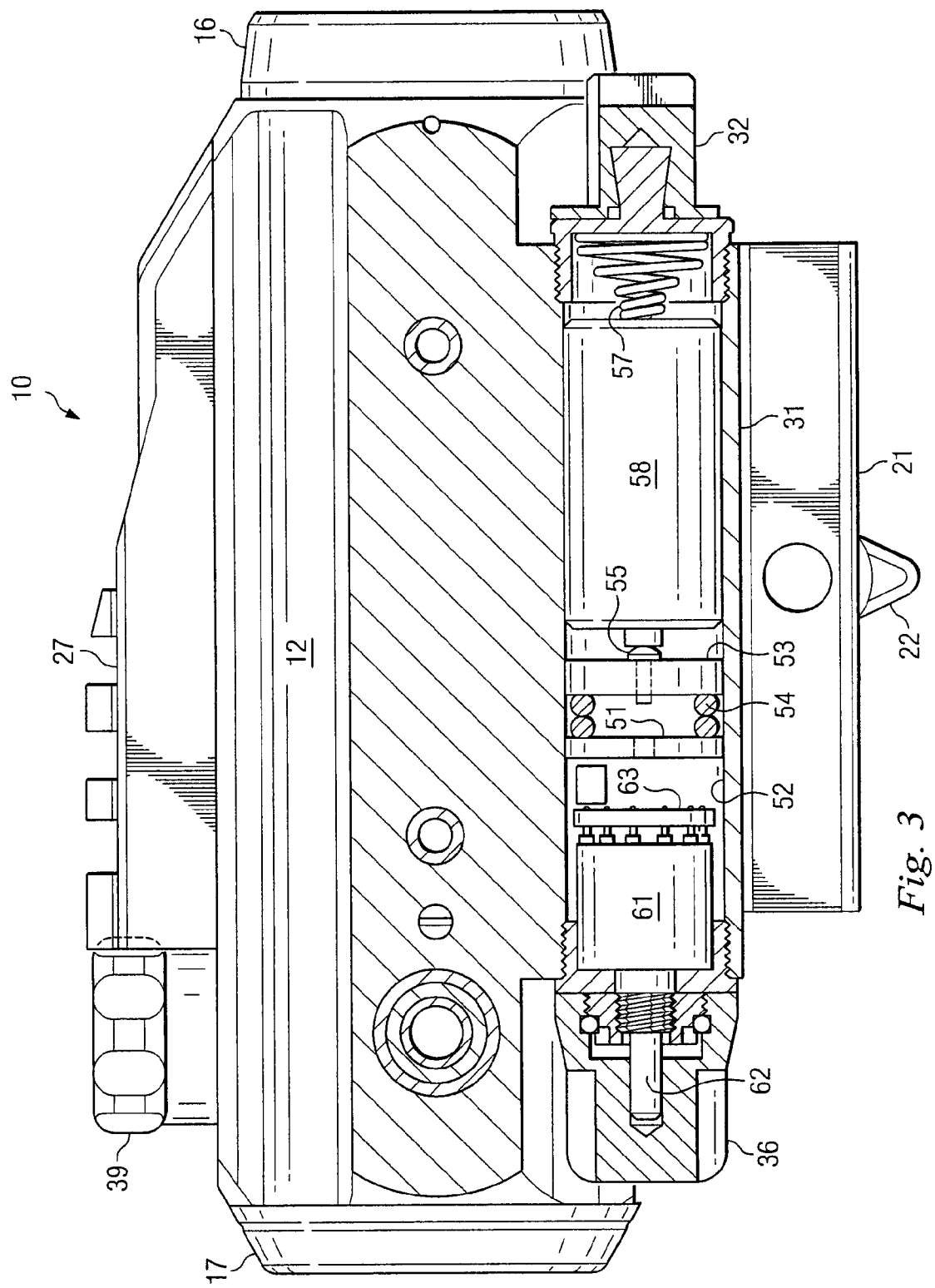
FIG. 3 is a diagrammatic side view of the sight of FIG. 1, partly in section.

FIG. 3 is a diagrammatic side view of the sight 10, partly in section. A wall 51 is fixedly mounted within a cylindrical opening 52 that extends through the cylindrical tube 31. A circular disk 53 is axially movably supported within the opening 52, between the wall 51 and the removable battery cover 32. Two resiliently flexible O-rings 54 are provided between the wall 51 and the disk 53. An electrically conductive metal contact 55 is mounted in the center of the disk 53, and serves as an electrical contact. An electrically conductive metal coil spring 57 is mounted on the inner side of the battery cover 32, and also serves as an electrical contact. A battery 58 is provided between the disk 53 and the spring 57, with one end engaging the electrical contact 55, and the other end engaging the electrical contact defined by the spring 57. In the disclosed embodiment, the battery 58 is a commercially-available 3-volt lithium battery, but it could alternatively be any other suitable type of battery.

On the side of the wall 51 opposite from the battery 58, a multi-position electrical switch 61 is fixedly mounted within the opening 52 through the tube 31. The switch 61 has a rotatable shaft 62, and the control knob 36 is fixedly mounted on the shaft 62. The opposite side of the switch 61 has several electrical terminals, and a circuit board 63 is soldered to the terminals of the switch 61. The circuit board 63 is electrically coupled to the electrical battery contacts 55 and 57 by respective wires, which are not shown in FIG. 3. The switch 61 and the circuitry on the circuit board 63 serve to permit variation of the brightness of an illuminated reticle, which is discussed later. In this regard, the switch 61 has 15 operation positions. In one of these positions, the switch 61 turns off the circuitry on the circuit board 63. The other 14 positions of the switch 61 correspond to respective different levels of brightness for the illuminated reticle.

Figure 4:
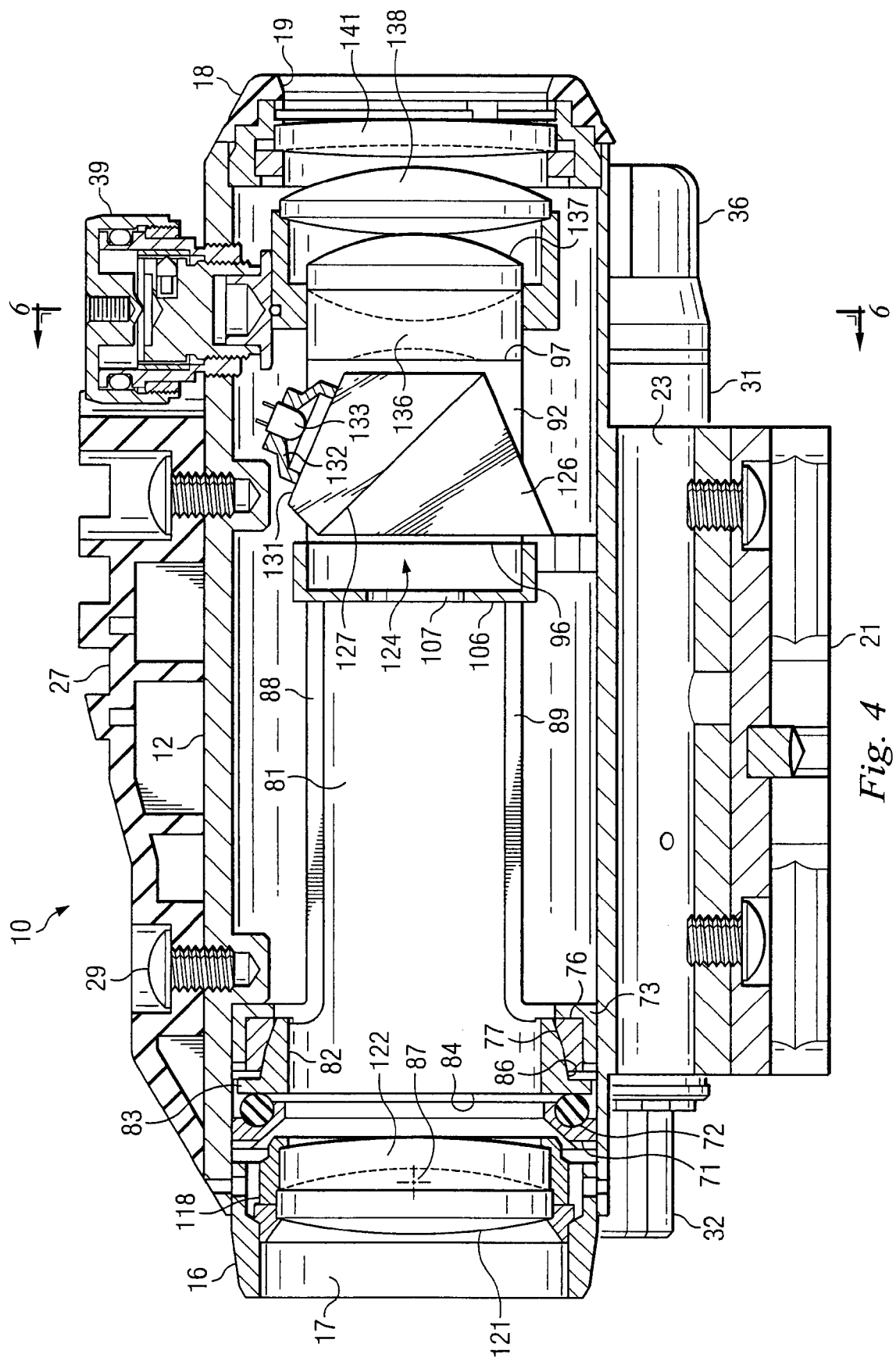
FIG. 4 is a diagrammatic central sectional side view of the sight of FIG. 1.
Figure 5:
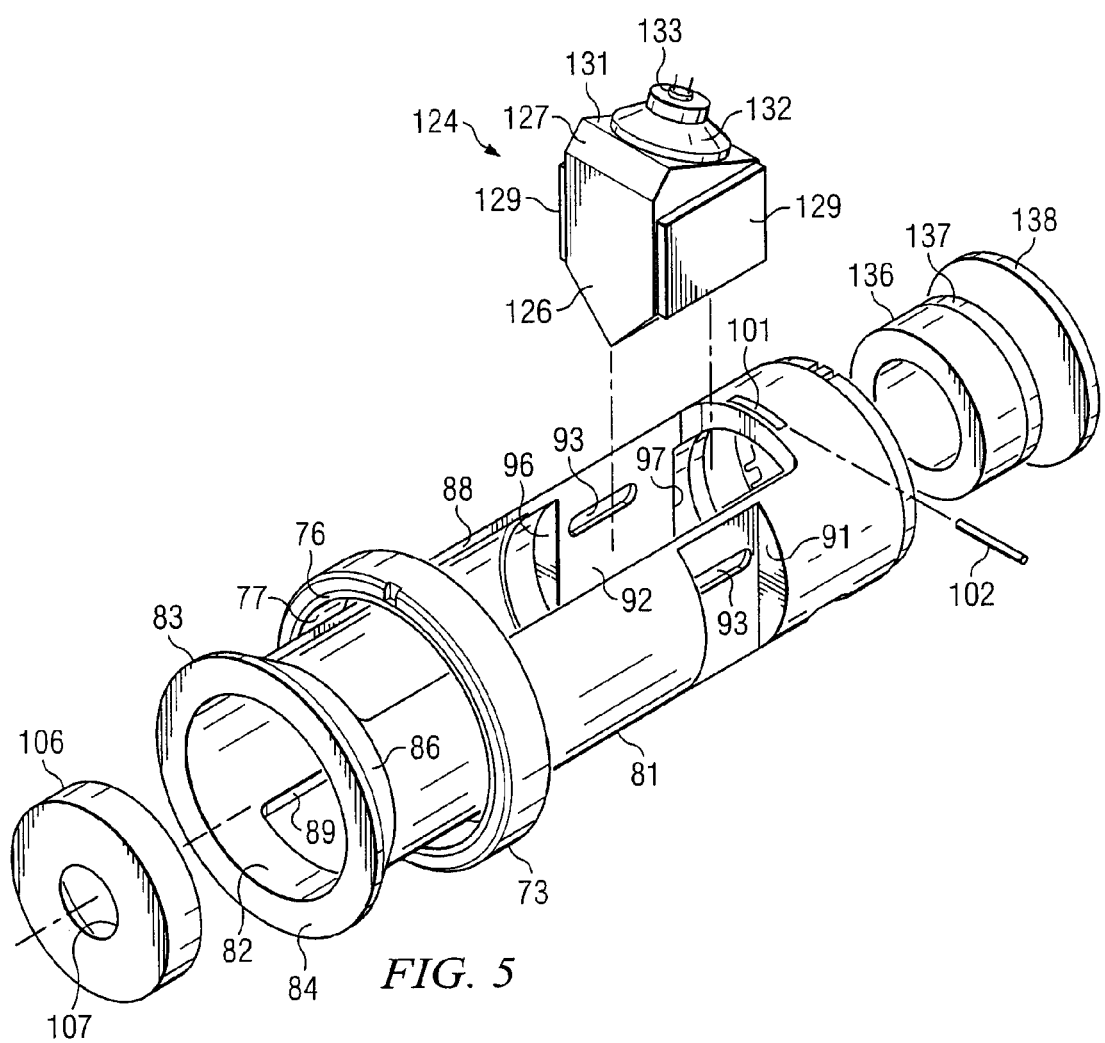
FIG. 5 is a diagrammatic exploded perspective view of several selected components from the interior of the sight of FIG. 1.

FIG. 4 is a diagrammatic central sectional side view of the sight 10. FIG. 5 is a diagrammatic exploded perspective view of several selected components from the interior of the sight 10. With reference to FIGS. 4 and 5, an annular retainer 71 is fixedly mounted within the opening through the tubular housing 12, at an end of the housing near the ring 16. A resilient O-ring 72 is supported on a side of the retainer 71 opposite from the ring 16. A further annular retainer 73 is fixedly mounted in the opening through the housing 12, a short distance inwardly from the retainer 71 and O-ring 72. An annular bearing member 76 is supported on the annular retainer 73, and has an inwardly-facing bearing surface 77 that is a portion of a spherical surface.

An approximately cylindrical tube 81 is provided within the housing 12, and has a central opening 82 extending therethrough. The tube 81 has an annular flange 83 that projects radially outwardly from one end thereof, and an axially facing end surface 84 is provided on the flange 83. The flange 83 also has an outwardly-facing annular bearing surface 86, which is a portion of a spherical surface. The annular flange 83 is disposed between the O-ring 72 and the bearing member 76, with the end surface 84 engaging the O-ring 72, and the bearing surface 86 slidably engaging the bearing surface 77. Due to the sliding engagement of the bearing surfaces 77 and 86, the tube 81 is capable of a very small amount of pivotal movement relative to the housing 12. In particular, this relative pivotal movement occurs about a pivot point 87 that is located at the centerpoint of the partial spherical surfaces 77 and 86. As the tube 81 pivots, the flange 83 will slightly compress one side of the resilient O-ring 72.

The tube 81 has an axially-extending slot 88 through the upper wall thereof, and a similar axially-extending slot 89 through the bottom wall thereof. Two vertically extending grooves 91 are provided on opposite sides of the tube 81, at a location spaced along the tube 81 from the flange 83 by a distance that is approximately three-quarters of the length of the tube. Within the tube 81 are two spaced, vertical, planar surface 92 that are axially aligned with the grooves 91, and that are parallel and face each other. In each of the vertical grooves 91, the inner surface has a horizontally-extending slot 93 that opens through the associated planar surface 92. Axially-facing shoulders 96 and 97 are provided at the opposite axial ends of each of the surfaces 92. The top surface of the tube 81 has a transverse groove 101 adjacent an end of the slot 88 remote from the flange 83. A cylindrical pin 102 is disposed partially within the groove 101. The sight 10 also includes another similar groove and pin that are offset by 90° from the groove 101 and pin 102, and that are not visible in FIGS. 4 and 5 because they are on the side of the tube 81 that is not visible in FIG. 5.

A circular aperture stop 106 is fixedly mounted within the opening 82 that extends through the tube 81, in engagement with the two axially facing shoulders 96. The aperture stop 106 has a circular aperture opening 107 provided through the center thereof. In the disclosed embodiment, the aperture stop is held in place by a commercially-available adhesive, such as an epoxy adhesive.

An annular lens support 118 is fixedly supported within the ring 16. Two objective lenses 121 and 122 are supported by the lens support 118, and together form a lens doublet that collects and focuses incoming radiation from a not-illustrated scene. In the disclosed embodiment, the objective lens 121 is positioned so that a rear nodal point thereof is disposed at the pivot point 87 for the tube 81.

A prism assembly 124 includes a prism arrangement of a known type, including a lower or entrance prism 126, and an upper or rear prism 127. The lower prism 126 is a type of prism sometimes referred to as a roof prism. In the disclosed embodiment, the prism assembly 124 is a Pechan prism system of a type known in the art, but it could alternatively be a Porro prism system, an Abbe-Koenig prism system, or a suitable arrangement of lenses. The prism assembly 124 includes rectangular support plates 129 that are provided on opposite sides of the two prisms 126 and 127. In the disclosed embodiment, the support plates 129 are adhesively secured to the two prisms 126 and 127, for example with a commercially-available epoxy adhesive. The support plates 129 maintain the prisms 126 and 127 in a fixed positional relationship, with a very small air gap between two adjacent and parallel surfaces on the prisms.

The prism assembly 124 inverts and reverts an optical image formed by the objective lenses 121-122, so as to effect image erection. An upper surface 131 of the upper prism 127 serves as an image plane of the sight 10, and has a reflective coating thereon to reflect light from a scene that is traveling through the sight 10. The reflective coating on the surface 131 has a not-illustrated reticle pattern etched therethrough. A light emitting diode (LED) 133 is supported by an LED holder 132, and the LED holder 132 is adhesively secured to the outer side of the reflective coating on surface 131. The terminals of the LED 133 are electrically coupled by not-illustrated wires to the circuit board 63 (FIG. 3). When the LED 133 is illuminated, light from the LED passes through the reticle pattern etched in the reflective coating, so as to superimpose an image of the reticle onto an image of the scene that is passing through the sight 10.

The outer sides of the support plates 129 each engage a respective one of the vertical planar surfaces 92 that are located within the tube 81. During factory assembly of the sight 10, when the prism assembly 124 has been properly positioned within the tube 81, an adhesive is injected through each of the horizontal slots 93, so that the adhesive is present between the surfaces 92 and the plates 129. The adhesive secures the plates 129 to the surfaces 92, thereby fixedly securing the prism assembly 124 within the tube 81.

Three eyepiece lenses 136, 137 and 138 are fixedly supported within the tube 81 at the end thereof remote from the flange 83. The lenses 136 and 137 form a lens doublet. The eyepiece lenses 136-138 optically process radiation from the prism assembly 124, including color correction, so that the image can be properly viewed by the eye of a person using the sight 10.

An optically-transparent window 141 is fixedly secured within the ring 18 at the eyepiece end of the housing 12. The window 141 has no optical power, and is provided to physically seal the eyepiece end of the housing 12. The housing 12 can thus be optionally filled with a gas such as dry nitrogen. As explained earlier, the tube 81 is capable of a very limited amount of pivotal movement about the pivot point 87. It should be noted that the aperture stop 106, the prism assembly 124, and the eyepiece lenses 136-138 are all supported on the tube 81, and thus all pivot with the tube 81. In contrast, the objective lenses 121-122 and the window 141 are fixedly supported on the housing 12, and do not move with the tube 81.

Figure 6:
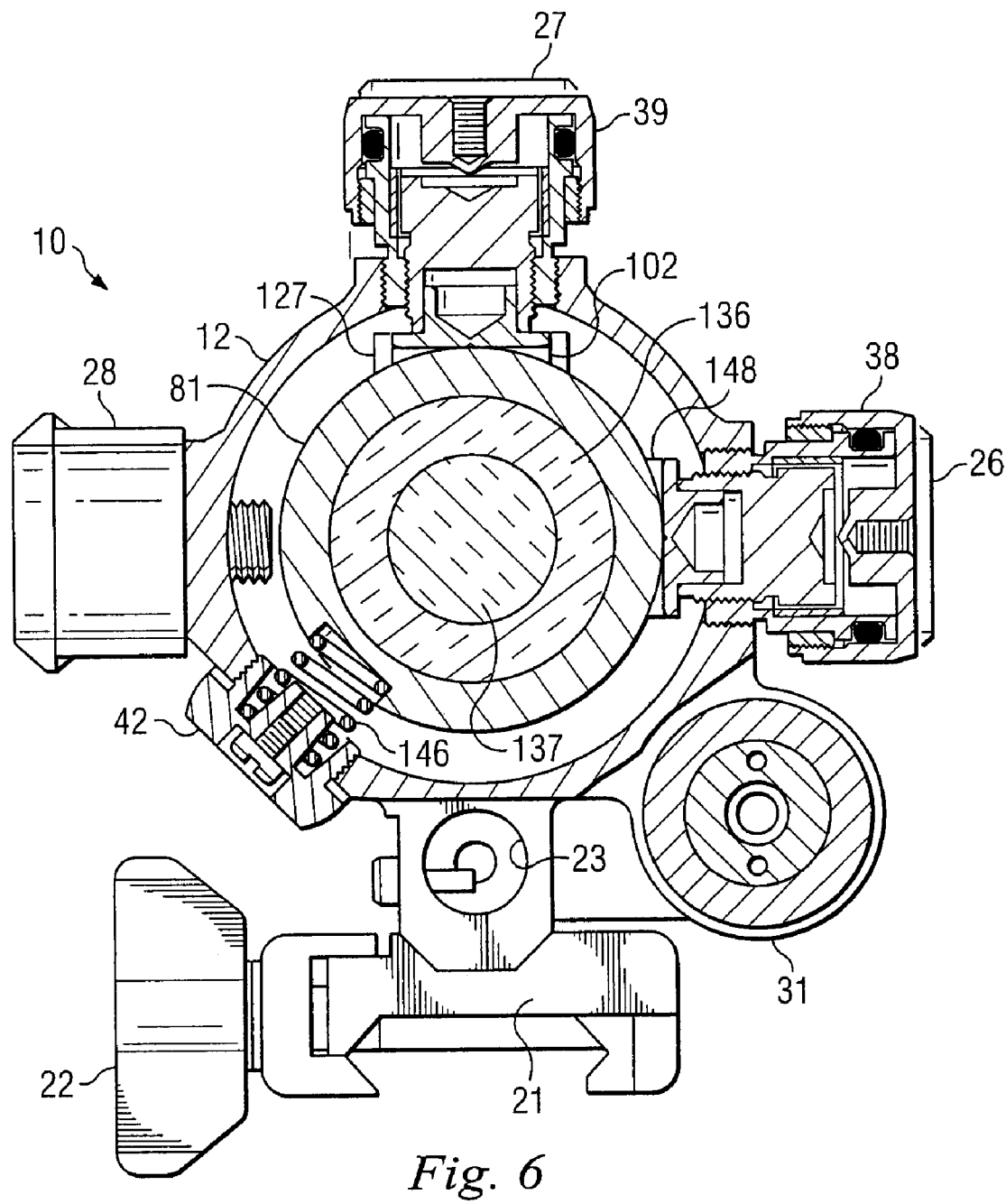
FIG. 6 is a diagrammatic sectional view of the sight, taken along the section line 6-6 in FIG. 4.

FIG. 6 is a diagrammatic sectional view taken along the section line 6-6 in FIG. 4. As discussed earlier, the spring retaining cap 42 threadedly engages an opening in a wall of the housing 12. A coil spring 146 has one end stationarily supported on the spring retaining cap 42. The other end of the spring 146 is disposed in a shallow circular recess provided in the exterior surface of the pivotal tube 81, near an end of the tube 81 remote from the pivot point 87 (FIG. 4). The spring 146 resiliently urges this end of the tube upwardly and rightwardly in FIG. 6.

FIG. 6 shows the pin 102 that, as discussed above, engages a groove provided in the top surface of tube 81. As also mentioned earlier, a similar groove is provided in a side surface of the tube 81, and a further pin 148 engages this further groove. The adjusting knob 38 is part of an adjusting mechanism that is secured in a horizontal opening through the housing 12, and that operatively engages the pin 148. When the knob 38 is manually rotated in one direction, its adjusting mechanism moves the pin 148 and the associated end of the tube 81 leftwardly in FIG. 6, against the urging of the spring 146. When the knob 38 is manually rotated in the opposite direction, its adjusting mechanism retracts and allows the spring 146 to move the tube 81 and pin 148 rightwardly in FIG. 6.

The adjusting knob 39 is part of a similar adjusting mechanism that is mounted in a vertical opening through the housing 12, and that cooperates with the pin 102. When the knob 39 is manually rotated in one direction, its adjusting mechanism moves the pin 102 and tube 81 downwardly in FIG. 6, against the urging of the spring 146. When the knob 39 is manually rotated in the opposite direction, its adjusting mechanism retracts and allows the spring 146 to move the tube 81 and pin 102 upwardly in FIG. 6. Thus, by manually rotating either or both of the adjusting knobs 38 and 39, the pivotal position of the tube 81 can be adjusted.

Figure 7:
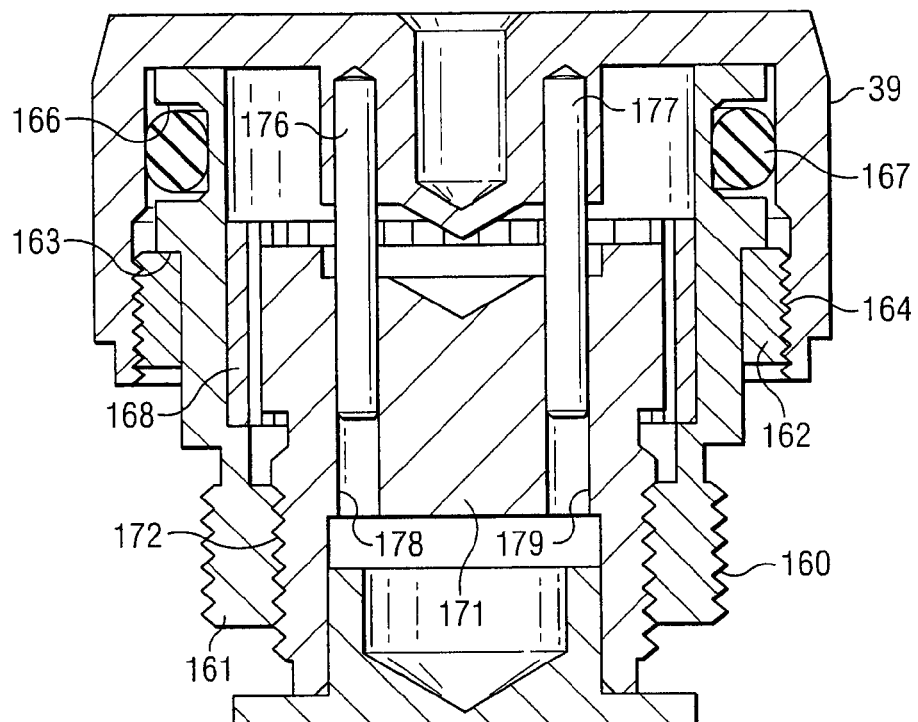
FIGS. 7 and 8 are respective diagrammatic vertical sectional views of an adjusting mechanism that is part of the sight of FIG. 1, taken along respective vertical section planes that are offset by 90° with respect to each other.
Figure 8:
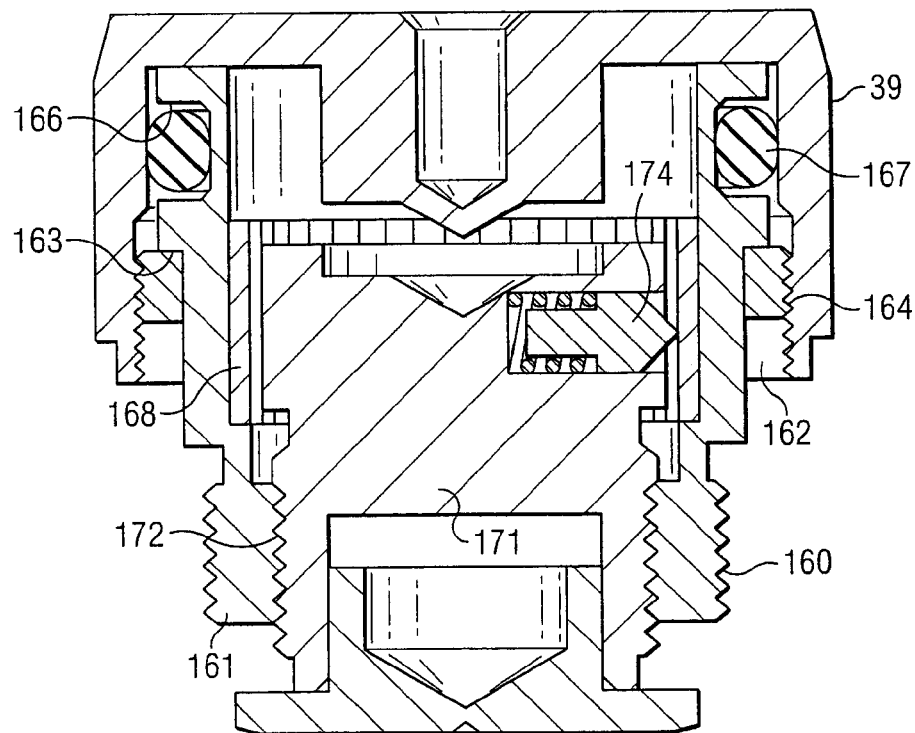

The two adjusting mechanisms that respectively include the knobs 38 and 39 are effectively identical. Therefore, only one of these adjusting mechanisms will be illustrated and described in detail. In this regard, FIGS. 7 and 8 are respective diagrammatic vertical sectional views of the adjusting mechanism that includes the knob 39. FIGS. 7 and 8 are taken along respective vertical section planes that are offset by 90° with respect to each other about the vertical axis of rotation of the knob 39.

With reference to FIGS. 7 and 8, the adjusting knob 39 is approximately cup-shaped. A vertical and approximately cylindrical sleeve 161 has an upper end that extends into the knob 39. The sleeve 161 has external threads 160 at its lower end, and the threads 160 engage a threaded vertical opening provided through the housing 12, in order to fixedly secure the adjusting mechanism to the housing. A retaining ring 162 encircles the sleeve 161, and engages a downwardly-facing shoulder 163 provided on the sleeve 161. As indicated at 164, external threads on the retaining ring 162 engage internal threads provided on the knob 39. The knob 39 and retaining ring 162 are fixedly secured to each other by an adhesive disposed within the threads 164. The knob 39 and retaining ring 162 can rotate relative to the sleeve 161. The upper end of the sleeve 161 has an external surface with an annular groove 166, and a resilient O-ring 167 is provided in the groove 166, and slidably engages an inner surface of the knob 39.

A detent ring 168 is fixedly secured within the sleeve 161 by an adhesive. The inner surface of the detent ring 168 has a plurality of vertically extending ribs that are angularly spaced, so as to define a series of detents. A rotor 171 is supported within the sleeve 161 for rotation with respect to the sleeve about a vertical axis. As indicated at 172, external threads on the rotor 171 engage internal threads provided on the lower end of the sleeve 161, so that relative rotation of the rotor 171 and sleeve 161 causes vertical axial movement of the rotor 171 within the sleeve 161. A detent pin 174 is radially movably supported within a horizontal radial bore in the rotor 171. The detent pin 174 is yieldably urged radially outwardly by a small coil spring disposed within the bore. The detent pin 174 has a point at its outer end, and the point cooperates with the vertical ribs on the detent ring 168, in order to yieldably resist rotation of the rotor 171 with respect to detent ring 168 and sleeve 161.

Two cylindrical rods 176 and 177 each have an upper end fixedly secured to the knob 39, and have lower ends that are slidably received within respective vertical openings provided in the rotor 171. A plunger 181 is supported at the lower end of the rotor 171, and can rotate with respect to the rotor. There is no direct attachment between the plunger 181 and the rotor 171. Instead, when the adjusting mechanism of FIGS. 7-8 has been installed in the sight 10, the plunger 181 is operationally held between the rotor 171 and the pin 102 (FIGS. 4 and 6), and is not able to escape.

When the knob 39 is manually rotated with respect to the sleeve 161 and the detent ring 168, the rods 176 and 177 cause the rotor 171 to also rotate with the knob. As the rotor 171 rotates relative to the detent ring 168, the detent pin 174 is pushed inwardly against the force of its coil spring as the tip of the pin 174 slides over each vertical rib on the detent ring 168. When rotation of the knob 39 ceases, the tip of the pin 174 engages the vertical groove between two adjacent vertical ribs on the detent ring 168, thereby yieldably resisting inadvertent rotation of the knob 39 and rotor 171 with respect to the sleeve 161 and the detent ring 168.

Due to the threaded engagement between the rotor 171 and the sleeve 161 at 172, relative rotation of the rotor 171 and sleeve 161 causes the rotor 171 and the plunger 181 to move axially with respect to the sleeve 161, or in other words vertically in FIGS. 7 and 8. As discussed above in association with FIG. 6, downward movement of the plunger 181 forces one end of the tube 81 downwardly against the force of the coil spring 146, and upward movement of the plunger 181 permits the coil spring 146 to move that end of the tube 81 upwardly.

FIG. 9 is a diagrammatic view showing the optical elements of the sight 10, and also showing the chief and marginal rays of radiation from a not-illustrated scene that is traveling through the sight 10. In use, the eye 191 of a user is positioned at the exit pupil of the sight 10, where the exit pupil is the image of the aperture stop 106 as produced by the eyepiece lenses 136-138. The incoming radiation from the scene enters through the objective lenses 121-122, which form an image. This image is inverted and reverted by the prisms 126-127 so that, when viewed through the eyepiece lenses 136-138, the image of the scene and reticle at the image plane defined by surface 131 has the correct orientation. When the sight 10 is properly aligned to a rifle or other weapon on which it is mounted, the center of the reticle cross-hair pattern (which defines the line of sight) will be aligned with the striking point of a bullet fired to a particular object distance that is commonly known as the "sighting in" distance.

As discussed earlier, the aperture stop 106, the prisms 126-127 and the eyepiece lenses 136-138 all pivot with the tube 81 about a pivot point 87. As also discussed earlier, this pivot point 87 is disposed at the rear nodal point of the objective lens 121. It would alternatively be possible for the pivot point 87 to be at a different location. For example, the pivot point 87 could be at a location shifted rightwardly in FIG. 9 from the rear nodal point of the lens 121. However, as the pivot point 87 is moved rightwardly in FIG. 9 toward the eyepiece, any pivotal movement of the tube 81 away from a centered position causes the chief ray of the axial field (the true zero field) to become decentered on the objective lenses 121-122, so that the objective lenses 121-122 work as a decentered optic. This decentration introduces aberrations that reduce the resolution of the sight 10.

In FIG. 9, the sight is shown in its nominal zero pointing error position. The eyepiece lenses 136-138 and the prisms 126-127 are centered on the axial chief ray, which passes through the front and rear nodal points of the objective lens 121, and through the center of the aperture stop 106. Assuming for the sake of discussion that the target is a point object located at the sighting distance, then at the zero degree field (the shot-targeted field), the point object will be imaged to the center 193 of the reticle cross-hair.

FIG. 10 is a diagrammatic view similar to FIG. 9, but showing a pointing error of θ° degrees. In particular, when a pointing error of θ° degrees is present, the zero degree field is imaged to a image height $h_{error}$ 196 at the image plane and reticle of:

$$h_{error} = f_{ob}\theta\left[\frac{3.14}{180}\right]$$

where $f_{ob}$ is the focal length of the objective lens arrangement 121-122. Typically, θ would be less then 2°. This would represent a mechanical misalignment of 3.5 mm over a length of 100 mm, or in other words a considerable misalignment.

Figure 11:
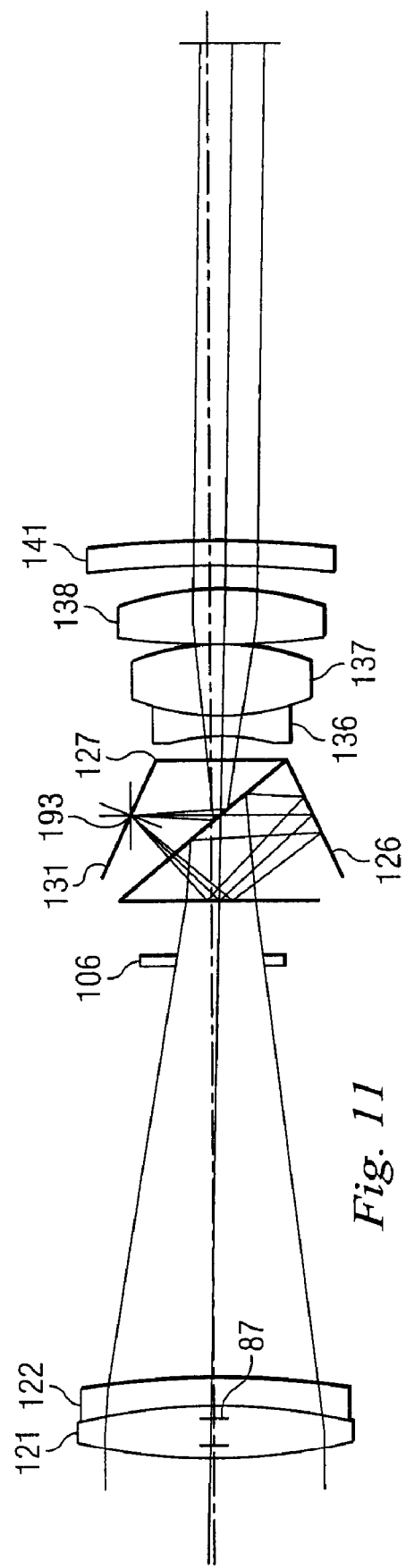
FIG. 11 is a diagrammatic view similar to FIG. 10, but showing the relative position of the optical components after a correcting pivotal movement of certain optical components.

In order to adjust this image height error $h_{error}$ 196 to zero, one or both of the adjusting knobs 38 and 39 are manually rotated in order to pivot the tube 81 that supports the aperture stop 106, prisms 126-127, and eyepiece lenses 136-138. In particular, the tube 81 is pivoted about the pivot point 87 by an angle of −θ°. FIG. 11 is a diagrammatic view similar to FIG. 10, but showing the relative position of the optical components after the correcting pivotal movement of the tube 81 and the optical components thereon. Following this pivotal corrective movement of −θ°, the chief ray for the true 0° field will pass through the rear nodal point of the lens 121, and through the center of the aperture stop 106, so that the prisms 126-127 and the eyepiece lenses 136-138 again work as a centered optical system. Since the chief ray passes through the rear nodal point at 87, the objective lenses 121-122 are also centered, but are effectively tilted at an angle of θ°. Consequently, since the chief ray of the axial field is centered at the objective lenses 121-122 and also at the eyepiece cluster 136-138, good imagery is obtained.

To evaluate the performance of the disclosed zeroing technique, it is useful to look at the performance fall-off in terms of resolution, and also astigmatism as a function of zero setting for the axial field. Resolution is typically characterized in terms of the value of the Modulation Transfer Function (MTF), evaluated for a particular image spatial frequency. This can be calculated for a sinusoidal object, which in an afocal system is an object with an ideal image intensity variation with angle θ at (angular) frequency f of A(1+cos(2πfθ)). The calculation includes measuring the intensity variation (Imax, Imin) at the image plane, and calculating MTF(f)= ((Imax−Imin)/(Imax+Imin)). The limit of resolution of the human eye is generally accepted to be 1 arc minute at the retina for a 4 mm eye pupil, and this corresponds to a spatial frequency of 0.5 cycles/arc minute. The modulation or MTF delivered at this frequency by an optical system to the eye should be at least 0.25 in order to be detectable by the eye.

Depending on the zeroing mechanism, when a sight is zeroed, various effects may be seen on the resolution for the axial field. The most significant contributors to resolution loss are axial coma and astigmatism. The effect of coma on a point object is to produce a comet-like flare in the image, thereby reducing the resolution. Astigmatism occurs when horizontal lines (tangential for y fields) and vertical lines (sagittal for y fields) are not seen at the same image distance. Commonly, a visual instrument will be set up during assembly so that the eye must accommodate to see the image approximately 1.3 meters away. For the axial field, this is a −0.75 Diopter setting and represents a preferred focus position for the "relaxed eye". Astigmatism may be present in the visual instrument (for example the vertical line might effectively be focused at 1.5 meters or 0.67 Diapers, while the horizontal line might effectively be focused at 1.1 meters or 0.91 Diopters, so that the astigmatism is 0.24 Diopters). In the case of astigmatism, the eye can refocus to image one but not both of the two line orientations sharply, and will tend to adjust to some intermediate image position with loss of resolution for both images. In general, astigmatism below about 0.25 Diopters is considered to be acceptable for visual instruments.

Figure 12:
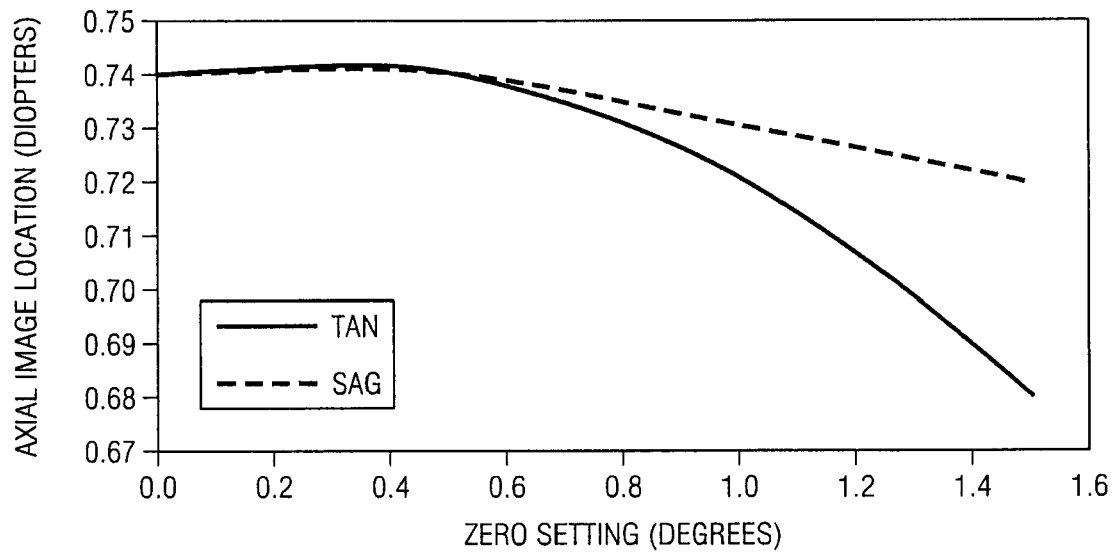
FIG. 12 is a graph showing the extent of change in accommodation of an eye that is required (for axial tangential and sagittal lines) as the zero setting is changed.
Figure 13:
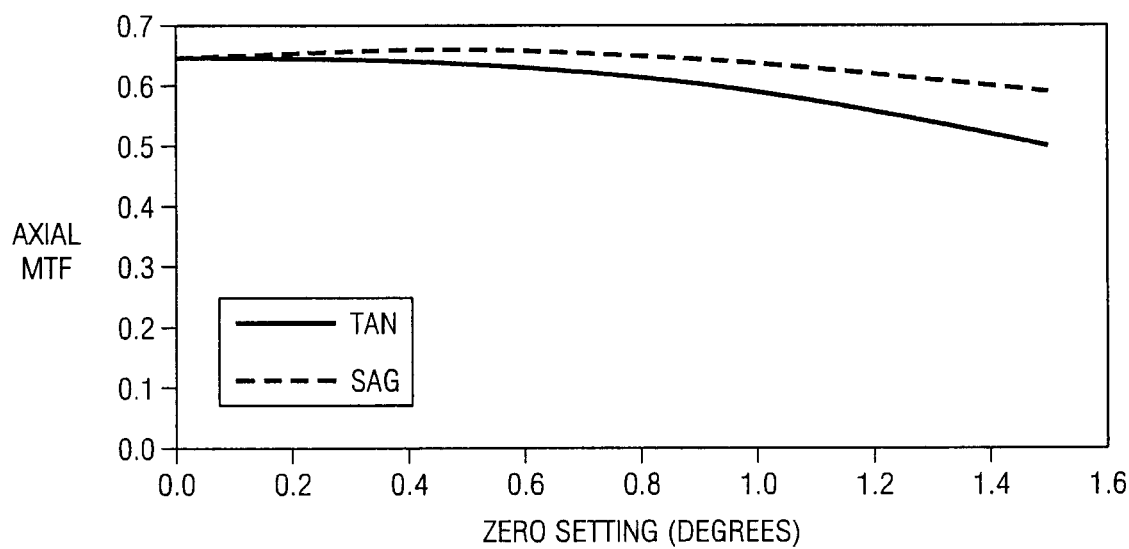
FIG. 13 shows the effect on Modulation Transfer Function (MTF) as the zero error correction is increased.

FIGS. 12 and 13 are graphs showing the impact of zeroing on the astigmatic performance of the sight 10 using the disclosed zeroing technique, and considering only the axial field. This data was obtained as follows:
1. The sight eyepiece was initially set to a diopter setting of −0.75 for an axial field with no zero error, prior to adjustment for the specified zero errors. The objective distance was set so that an object at 100 meters would be exactly focused to the reticle plane.
2. A zero error angle was imposed on the sight, and then the prism-eyepiece cluster was pivoted by the negative of this angle to correct the zero.
3. The eye was then allowed to refocus as required for the new zero setting. This means that the object at 100 meters is no longer focused exactly to the reticle plane.

FIG. 12 shows the extent of change in accommodation of the eye that is required (for axial tangential and sagittal lines) as the zero setting is changed. FIG. 13 shows the effect on MTF at 0.5 c/arc minute as the zero error correction is increased. It can be seen that, out to a zero correction of 1.5°:
1. There are approximately 0.04 Diopters of shift in location of the "best" image plane with the change in zeroing. This is quite a small change in eye accommodation. This represents a change in apparent object distance of about 5 meters for an object at 100 meters, and would contribute virtually no parallax, so that the effective "sighting in" distance is unchanged with zero setting.
2. The tangential and sagittal image planes are within 0.04 Diopters of each other. This is an insignificant amount of axial astigmatism.
3. There is a reduction in mean axial MTF of about 0.1. Since the axial performance of the sight is good, the loss of 0.1 in MTF leaves the performance well above the minimum MTF target of 0.25.

The results discussed above are specific to the disclosed sight 10, but they illustrate the general result that, for this zeroing method, the axial field performance is relatively unaffected, even for fairly large zero adjustments. The effects of zeroing on performance across the field are also not severe.

In the disclosed embodiment, the prism assembly and the eyepiece cluster are all pivoted about a common pivot point. The aperture stop is also pivoted about this pivot point, because it is spaced from the front objective. Alternatively, however, the aperture stop could be stationary with respect to the housing if it was located adjacent the front objective. In the disclosed embodiment, the pivot point is advantageously located at the rear nodal point of an objective lens of the sight. The position of this pivot point is mechanically controlled very accurately, due to the use of cooperating machined spherical surfaces.

By moving both the prism assembly and the eyepiece cluster, as well as the aperture stop where appropriate, these optical components are always working as a centered optical system. This avoids the aberrations associated with decentration, and allows a large range of zeroing before aberrations cause any significant reduction in image quality. Because aberrations are small, the sight resolution for the axial and near to axis fields is only minimally affected by zeroing adjustments, giving good image quality throughout the zeroing range. Since the prism assembly and eyepiece cluster are adjusted together, the reticle cross-hair is always centered in the field of view, and the eye always has the same focus at the reticle plane. This approach works very well for prism-based sights that are relatively short, because the movement needed for the eyepiece optics during pivoting is at most a few millimeters.

Although one selected embodiment has been illustrated and described in detail, it will be understood that various substitutions and alterations are possible without departing from the spirit and scope of the present invention, as defined by the following claims.

What is claimed is:

1. A method of zeroing a sight having a housing with first and second openings, and having an optics section within said housing that optically influences radiation from a scene received through said first opening so as to deliver through said second opening a viewable image that is a function of the radiation, said optics section including image erecting optics, eyepiece optics and objective optics, said objective optics being stationarily supported on said housing, said method comprising:
supporting said image erecting optics and said eyepiece optics for pivotal movement relative to said housing about a pivot point located in the region of said objective optics; and
adjusting the position of said image erecting optics and said eyepiece optics relative to said housing.

2. A method according to claim 1,
wherein said objective optics includes an objective lens having a rear nodal point; and
including selecting said pivot point to be located approximately at said nodal point.

3. A method according to claim 1,
wherein said optics section includes an aperture stop spaced from said objective optics;
wherein said supporting includes supporting said aperture stop for movement relative to said housing; and
wherein said adjusting includes adjusting the position of said aperture stop relative to said housing.

4. A method according to claim 1,
wherein said optics section includes reticle inserting optics that adds a reticle image to radiation traveling through said optics section;
wherein said supporting includes supporting a part of said reticle inserting optics for movement relative to said housing; and
wherein said adjusting includes adjusting the position of said part relative to said housing.

5. A method according to claim 1, including:
configuring said image erecting optics to include an image erecting prism; and
configuring said eyepiece optics to include an eyepiece lens.

6. A method claim 1,
wherein said supporting includes supporting said image erecting optics and said eyepiece optics for movement to any of a plurality of different operational positions relative to said housing; and
wherein said adjusting includes maintaining said image erecting optics and said eyepiece optics stationary with respect to said housing in each of said operational positions.

7. A method according to claim 6, wherein said adjusting includes adjusting said image erecting optics and said eyepiece optics to a selected one of said operational positions in which a chief ray of a true zero field associated with said sight is centered with respect to said image erecting optics and said eyepiece optics.

* * * * *